(12) United States Patent
Levine et al.

(10) Patent No.: US 6,882,967 B2
(45) Date of Patent: *Apr. 19, 2005

(54) APPARATUS AND METHOD FOR REMOTE ADMINISTRATION OF A PC-SERVER

(75) Inventors: Jonathan Levine, Calgary (CA); Herb Peyerl, Calgary (CA)

(73) Assignee: Middle Digital Inc., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/632,985

(22) Filed: Aug. 4, 2003

(65) Prior Publication Data

US 2004/0024840 A1 Feb. 5, 2004

Related U.S. Application Data

(63) Continuation-in-part of application No. 09/492,090, filed on Jan. 27, 2000, now Pat. No. 6,732,159.

(51) Int. Cl.[7] .............................................. G06F 13/00
(52) U.S. Cl. ....................................................... 703/25
(58) Field of Search ................................ 709/200, 201, 709/208, 217, 218; 713/1, 2, 100; 703/24, 25; 345/740; 704/200, 258, 270, 270.1, 275

(56) References Cited

U.S. PATENT DOCUMENTS

| | | |
|---|---|---|
| 5,214,785 A | 5/1993 | Fairweather |
| 5,299,306 A | 3/1994 | Asprey |
| 5,325,529 A | 6/1994 | Brown et al. |
| 5,664,194 A | 9/1997 | Paulsen |
| 5,694,583 A | 12/1997 | Williams et al. |
| 5,732,268 A | 3/1998 | Bizzarri |
| 5,913,056 A | 6/1999 | Oliver |
| 5,978,912 A * | 11/1999 | Rakavy et al. ................. 713/2 |
| 6,732,067 B1 * | 5/2004 | Powderly ...................... 703/24 |

OTHER PUBLICATIONS

Key–View II URL www.cybex.com/cybex/cybexobjects.nsf/ObjectStore/kv2map/$file/kv2map.gif 2000.
AMD Preboot Execution Boot ROM Code URL www.amd.com/products/npd/management/mpp/22146.html 2000.
eRIC Installation and User Guide, Peppercon AG, dated Dec. 12, 2002.

* cited by examiner

Primary Examiner—Robert B. Harrell
(74) Attorney, Agent, or Firm—Sean W. Goodwin (57) ABSTRACT

Apparatus and method for remote administration of a PC-server and which enables remote keyboard input, even during re-boot sequence of the PC-server. The apparatus comprises an adapter emulating video of a display adapter to convert display data, including boot-level data at the console, for serial transmission to a remote user. Further, the microprocessor converts input commands from the user to a form compatible with the PC-server input interface such as scan codes for a keyboard input interface. Additionally, the method and apparatus of the present invention makes it possible to route textual data to a speech synthesizer at the boot level.

17 Claims, 8 Drawing Sheets

| Numeric Pad Keys | |
|---|---|
| kp0 | 0 |
| kp1 | 1 |
| kp2 | 2 |
| kp3 | 3 |
| kp4 | 4 |
| kp5 | 5 |
| kp6 | 6 |
| kp7 | 7 |
| kp8 | 8 |
| kp9 | 9 |
| kp. | Decimal |
| kpent | Enter |
| kp+ | Plus |
| kp- | Minus |
| kp* | Asterisk |
| kp/ | Slash |
| | |

| Miscellaneous Keys | |
|---|---|
| shift | Right Shift |
| ctrl | Right Control |
| alt | Right Alt |
| lshift | Left Shift |
| lctrl | Left Control |
| lalt | Left Alt |
| scrllk | Scroll Lock |
| prtscr | Print Screen |
| pause | Pause |
| enter | Enter |
| Point tab | Tab |
| esc | Escape |
| bs | Backspace |
| space | Space |
| minus | Minus / Hyphen |
| capslk | Caps Lock |
| numlk | Num Lock |

| Cursor Keys | |
|---|---|
| | |
| | |
| left | Left arrow |
| down | Down arrow |
| right | Right arrow |
| up | Up arrow |
| ins | Insert |
| del | Delete |
| home | Home |
| end | End |
| pgup | Page Up |
| pgdn | Page Down |

| Function Keys | |
|---|---|
| f1 | 1 |
| f2 | 2 |
| f3 | 3 |
| f4 | 4 |
| f5 | 5 |
| f6 | 6 |
| f7 | 7 |
| f8 | 8 |
| f9 | 9 |
| f10 | 10 |
| f11 | 11 |
| f12 | 12 |

| Modifier Keys | |
|---|---|
| s- | Right Shift |
| c- | Right Control |
| a- | Right Alt |
| S- | Left Shift |
| C- | Left Control |
| A- | Left Alt |

*Fig. 7*

| Key | Action |
|---|---|
| c | Configuration |
| i/o/r | Reset Button Operations |
| ^L | Redraw Display |
| m | Message Buffer |
| p | Last POST Byte |
| q | Quit to ROM |
| x | Send Key To PC |
| ^X | Get KBD Status |
| 1-9,0,-,= | Function Keys |

*Fig. 8*

APPARATUS AND METHOD FOR REMOTE ADMINISTRATION OF A PC-SERVER

CROSS REFERENCE TO RELATED APPLICATION

This application is a continuation-in-part of U.S. patent application Ser. No. 09/492,090 filed on Jan. 27, 2000, now U.S. Pat. No. 6,732,159, the entirety of which is incorporated herein by reference.

FIELD OF THE INVENTION

The present invention relates to communications interfaces and methods for use for remote administration of a personal computer being used as a server. A display emulator, input emulator and serial I/O are provided for forwarding BIOS level console output and for receiving emulation input data.

BACKGROUND OF THE INVENTION

Generally, servers operate unmanned and provide a common service to a plurality of manned computers, all connected by a network of some sort. Typically, a server maintains one or more local disks and services application requests from remote computers such as reading and writing to shared directories. Specifically engineered servers include those by Sun Microsystems, based on Motorola 680x0 or SPARC microprocessors (from Sun Microsystems, Inc., Mt. View Calif.). Usually, these servers utilize a Unix operation system, and utilize a hardware architecture and software which is easily remotely administrated, including the provision for serial I/O at the boot level for the output of character-based diagnostic messages. Due to the ability to route a server's console output through a serial device to an administrating terminal, it is usual to omit a video display (running headless) and omit a keyboard input. Sometimes one set of video and keyboard interfaces may be switched among many servers locally, or through a network.

Increasingly, lower cost Intel Pentium-based microprocessor personal computers are now also being implemented as servers (referred to herein as a PC-Server). However, such a PC-Server, equipped with a conventional Basic Input/Output System (BIOS), cannot be as readily administered remotely.

In such IBM PC and compatible Personal Computers (PCs), the PC-BIOS provides the lowest level interface and hardware drivers for peripheral input/output (I/O) devices, such as video output, keyboard input and media I/O. The video output during boot up at the BIOS level is generally ASCII character based as the hardware and memory intensive graphical characteristics of a Graphical User Interface (GUI) requires application programs and capable peripherals (e.g. video display).

On boot up, such a PC-BIOS outputs certain status information to a local video display but, unlike the engineered servers, and except for custom designs, it is not generally capable of output other than through the local video display. Such information includes a character display confirmation of the successful operation and identification of the video display device, the amount of RAM and the current status of BIOS settings such as the processor type, hard drive specifications, and the presence and type of other installed I/O devices. Opportunities are provided to a user to interrupt the boot process with a keyboard stroke and thereby modify the system PC-BIOS configuration or peripherals settings.

Once the operating system is running however, application programs are available to enable a remote user to access and manipulate certain of the computer settings. Such an application program is pcAnywhere, supplied by Symantec Corporation, of Cupertino, Calif. The pcAnywhere program and protocol provides communication components which enable remote control capabilities through a phone line or an internet interface. The user installs and runs a version of the pcAnywhere program on both the remote and the host PCs. Once loaded and running, the user at the remote PC can remotely access data and control applications located on the host PC. The usual communication protocol between the PCs is the TCP/IP Network Protocol, accessed through an internet connection.

However, after a reboot, control is not regained until the operating system is again loaded and the pcAnywhere application program is running again, long after any diagnostic messages are past. In a diagnostic situation, generally to resolve the situation which prompted a restart of the PC in the first place, monitoring of the BIOS level information is the most pertinent.

Further, during normal use of the PC occasionally, extraordinary system level errors occur and messages are displayed directly in a default character or text format on the normal graphical interface video display. Again, these are only displayed on the local video display.

In U.S. Pat. No. 5,214,785 to Fairweather, a controller is disclosed for remote operation of a host PC, particularly for remotely initiating host PC application programs, downloaded to the controller for operating a plurality of external peripherals—like household line-powered devices—even after the host PC is powered down. Fairweather envisions powering the host PC through a controller peripheral for permitting hard reboot of the host PC via interruption of the PC's power. The controller operation is dictated through software downloaded from corresponding applications started by the controller and running on the host PC. The controller is provided physically external to the PC and comprises a microprocessor, ROM-resident software, an RS-232 serial I/O communication device, and a keyboard emulation interface. An application program may be started through commands issued through the emulated keyboard interface. Once running, host PC application program can writing ASCII commands to the controller or download a program to the controller's ROM through the host PC's RS-232 port. Fairweather acknowledges that once the host PC has been brought up to operating system level, then Fairweather's RS-232 application program may be started. Accordingly, Fairweather's controller operates "blind" until their corresponding application program is operational.

Others have implemented external hardware which connect to the video output of the PC's own video card and thus are capable of rebroadcasting the data that appears on a local terminal, including boot screens, via modem to a remote user running a compatible operating system such as Windows 9X (Microsoft Corporation). In other words, what is fed to the monitor is rebroadcast. The remote system operates pcAnywhere protocol to enables remote control of the hardware. The remote user is limited to the information which is displayed and not to the additional yet useful non-displayed POST diagnostic information.

Applicants are unaware of means, either in the prior art, including the teachings of Fairweather, for administering a typical BIOS-equipped PC through boot without actually monitoring a local video display or manipulating a local keyboard. Accordingly, it is not known to perform administration, troubleshooting or for maintenance on such a PC-Server including the ability to review system level messages or reset the system, including to address the installed peripherals or to command selection of a different boot device.

Accordingly, for a PC-Server which has a standard BIOS and is headless, there has not yet been a satisfactory solution for the demonstrated need to provide remote console output to effect proper PC-Server administration.

SUMMARY OF THE INVENTION

Generally, the invention is an administration adapter for a PC-server which implements communications to a remote user for remote viewing of data available on the PC-Server's bus and for enabling remote keyboard input, even during re-boot sequence of the PC-server. The PC-Server recognizes the administration adapter as comprising both an emulated display adapter and an RS-232 serial communications device. Preferably the emulated display adapter emulates both the video frame buffer and video controller register. Further, power up self test or POST data is also written from the bus to the administration adapter so that it and display data is converted to a serial data stream and is serially output to the remote user. In return, remote user keyboard commands are received by the serial device, are converted to compatible scan codes (emulating the PC-Server's keyboard) and are routed to the PC-Server's input interface as though the commands were issued with a local input interface such as a keyboard.

Accordingly, in a broad method aspect of the invention, a method of remote user administration of a PC-Server having a data bus for read and write functions to peripherals including a display adapter, and having at least one keyboard input interface, comprising the steps of:

providing a peripheral adapter on the bus which emulates the display adapter to an extent necessary to receive display data from the bus and which has a communications device for transmission of data between the PC-Server and the remote user;

determining if the bus has written display data to the adapter;

extracting the display data from the adapter and converting the data from a graphical format as necessary;

transmitting the display data via the communications device to the remote user;

receiving input commands from the remote user via the communications device; and transmitting the received input commands to and in a form compatible with the input interface.

Preferably, the adapter emulates the video frame buffer of a display adapter, the display data is converted to ANSI escape sequences before transmission to the remote user, the input commands are converted into keyboard input interface compatible scan codes before transmission to a keyboard input interface, and that the display data and keyboard commands are communicated via a serial I/O device.

More preferably, the adapter further emulates the I/O port for the BIOS power up self test (POST) so that the status of the last write may be extracted and transmitted to the remote user for demonstrating the status of the most recent PC-Server BIOS initiation.

The method the invention is achieved using novel apparatus, which in a broad aspect comprises:

an adapter on the bus which emulates a display adapter to an extent necessary to receive display data from the PC-Server bus;

means for extracting the display data from the adapter;

means for transmitting the display data to a remote user;

means for receiving data from the remote user representing input interface commands to the PC-Server; and means for transmitting the input commands to and compatible with the PC-Server input interface.

Preferably, the adapter emulates at least the video frame buffer and video controller registers for a display adapter.

More preferably, the means for transmitting console output and receiving input commands is a serial communications device, the means for retrieving character data from the frame buffer and converting it for serial transmission is a microprocessor and a microprocessor converts the input commands to a form such as scan codes compatible with the PC-Server keyboard input interface.

The method and apparatus of the present invention also makes it possible to route textual data to a speech synthesizer at the boot level, which heretofore has required the operating system to be fully loaded to provide any text-to speech synthesis.

DETAILED DESCRIPTION OF THE PREFERRED EMBODIMENT

In this description, references to a PC-server are made in the context of an Intel Pentium-based or IBM-compatible personal computer however, as it will become evident, the invention is equally applicable to any microprocessor-based computer which is not designed or equipped to output to a remote console at the hardware and BIOS level, thereby precluding remote system administration.

A BIOS of a PC-Server is not generally equipped for serial device-to-console communications. Without either a console (video display) or local keyboard input, the PC-Server is incapable of being remotely supervised or administered until such time as the operating system is fully loaded. For the purposes of the description of the preferred embodiment, it is assumed that the PC-Server does not have either a local video display or keyboard.

Figure 1:
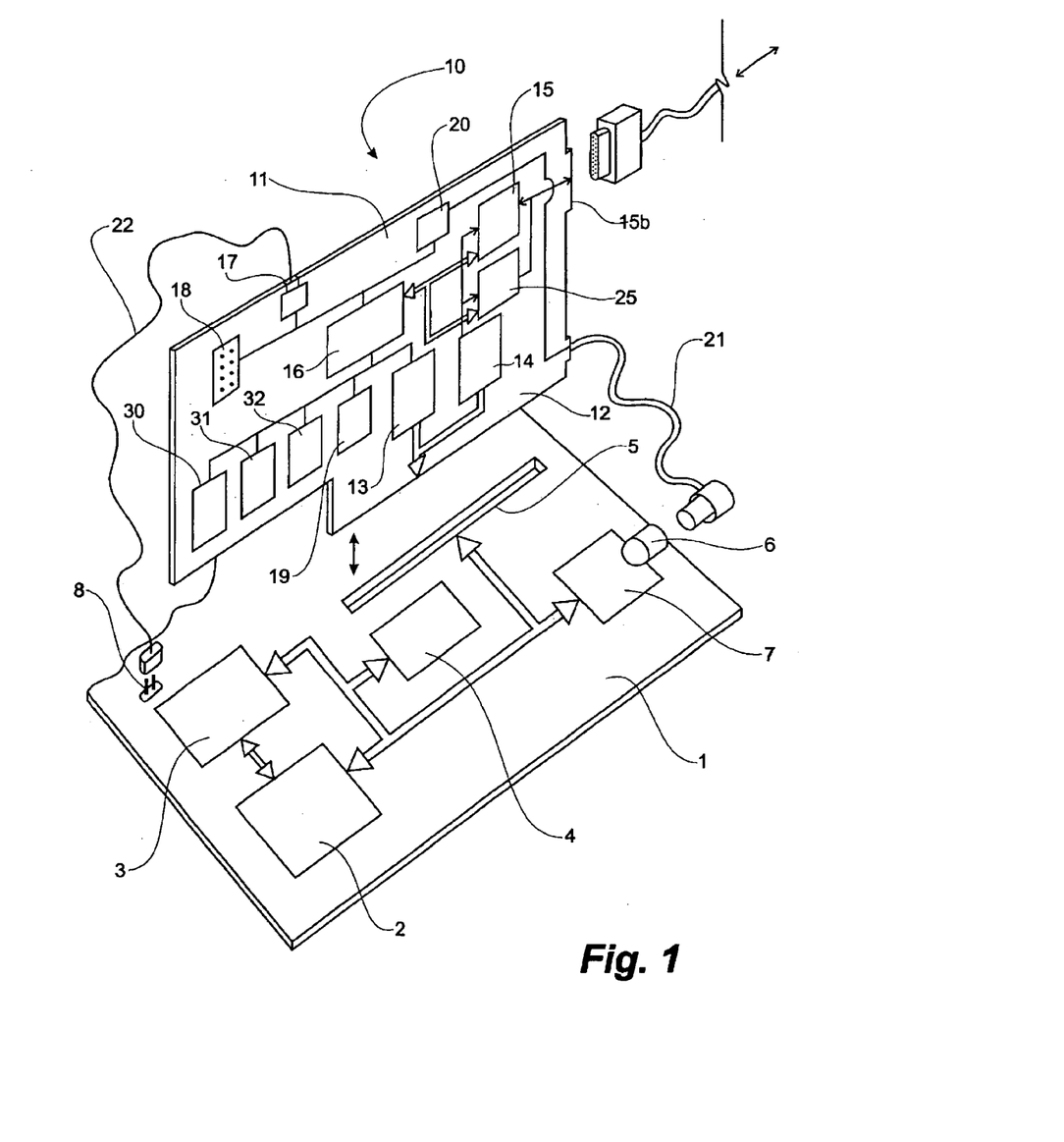
FIG. 1 is a schematic of the interface of an implementation of the administration adapter of the present invention and the system board of the PC-Server.

As shown in FIG. 1, and in a much simplified form, the PC-Server comprises a system board 1 supporting a Pentium microprocessor 2, RAM 3, a BIOS 4, and a bus 5. Common bus types include the older ISA (8–16 bit Industry Standard Architecture) and the PCI (32–64 bit Peripheral Component Interconnect) which enable communication between on-system board and peripheral devices. The microprocessor 2, BIOS 3 and RAM 4 are connected to a display adapter through the bus 5 and are connected through a keyboard controller 7 to a keyboard input interface as one form of input interface 6. A PC-Server may have one or more input interfaces 6. A reset switch 8 is provided for a hard reset of the system board 1.

Remote administration of the PC-Server is provided through an administration adapter 10 which emulates a display adapter on the bus 5, converts it to a stream compatible for transmission to a remote user at a remote console 9.

Video emulation herein comprises emulation of a combination of the components normally found in a video board (e.g. in the case of VGA: the video controller registers or a subset or superset thereof, video memory, and VGA BIOS firmware) that satisfy the host computer as to the presence of a video board and a method of transmitting or otherwise outputting the information stored in the video memory by the host computer, whether character or graphic or a combination of the two, typically via means other than a conventional video signal, regardless of whether the device also produces a conventional video signal.

Figure 2:
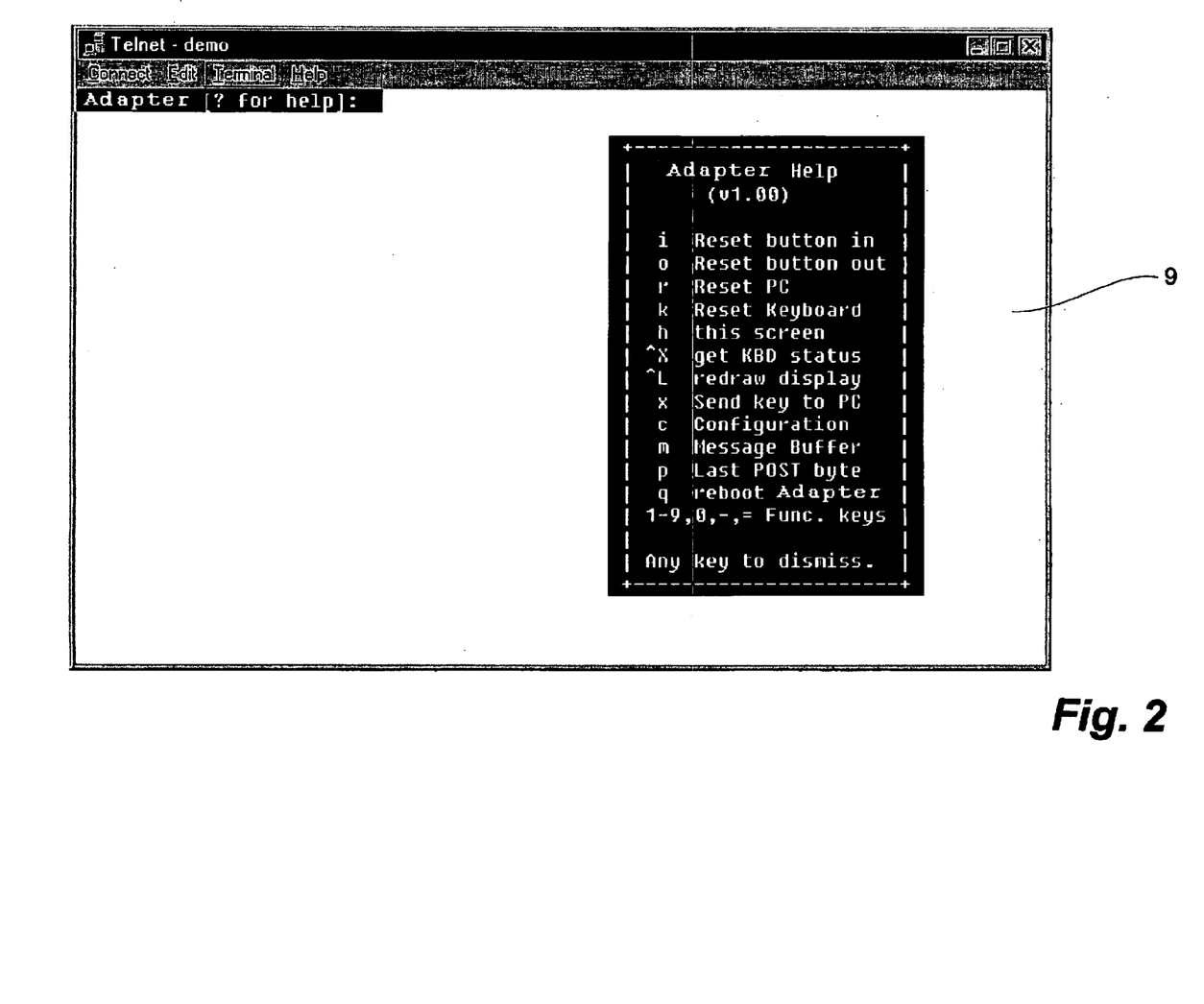
FIG. 2 is a screen display at a console of the remote user illustrating the administration adapter providing a help list of possible keyboard commands to a PC-Server.
Figure 3:
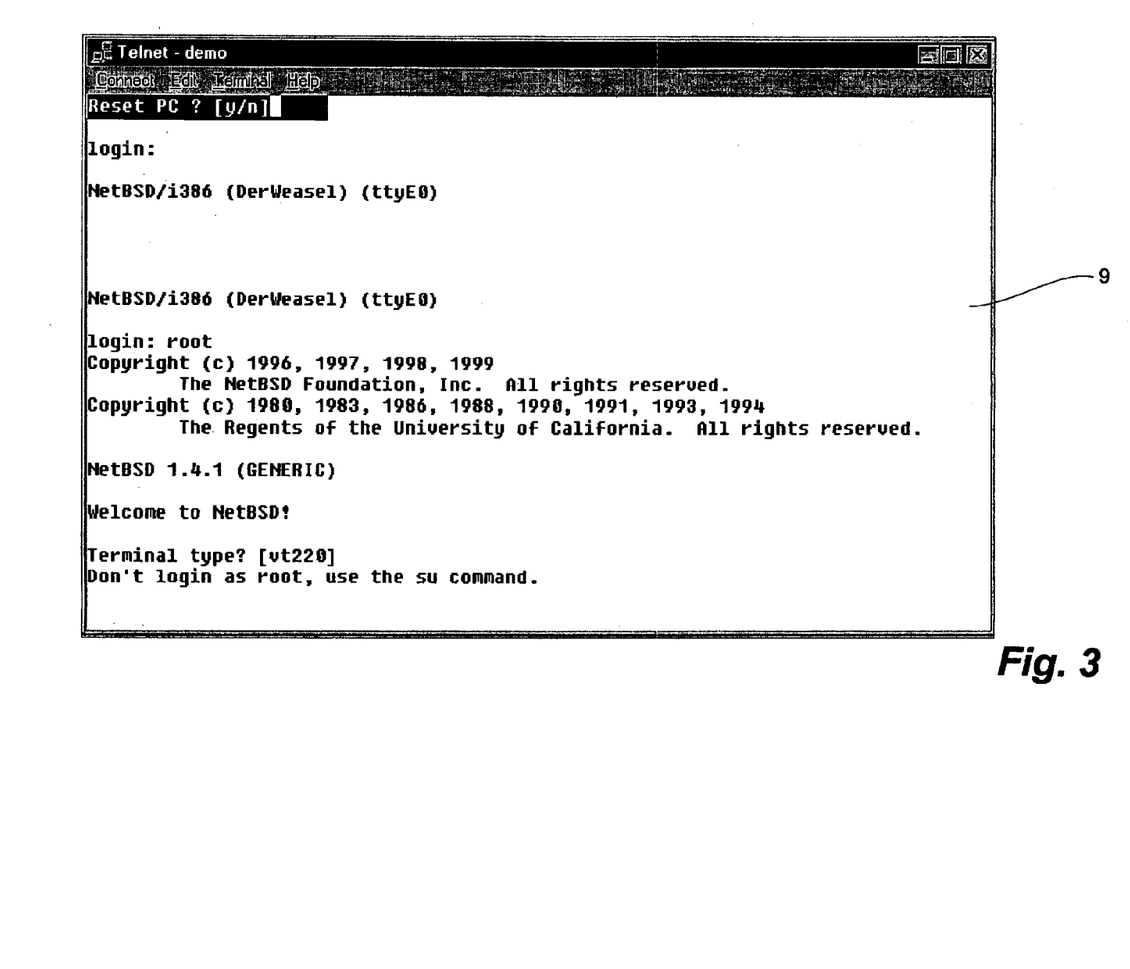
FIG. 3 is a screen display at a console of the remote user illustrating the PC-Server textual display data appearing at the console and poised to accept an emulated keyboard command to reset or reboot the PC-Server.
Figure 4:
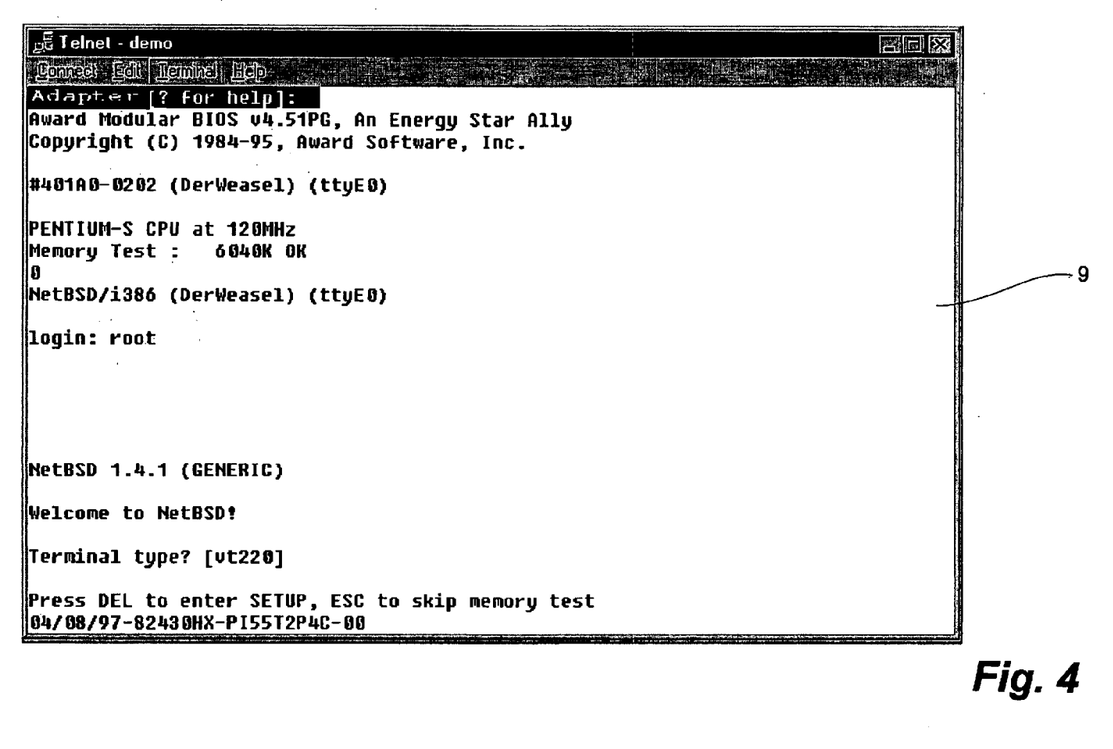
FIG. 4 is a screen display at a console of the remote user illustrating the PC-Server textual display data appearing at the console after the reset according to FIG. 3 and illustrating the BIOS level console output.

Accordingly, the administration adapter 10 satisfies the PC-Server of the presence of a display adapter (if no other is present) and provides means for communicating and receiving data other than the conventional video signal. Communicated data includes data stored in video memory by the PC-Server. Data may be textual, graphical or a combination of both. The administration adapter 10 comprises a circuit board 11 having a bus connection 12 which is hardware compatible with the system board bus 5. Having reference to FIGS. 2–4, the remote user is able to control and monitor the PC-Server. As described in greater detail below, FIG. 3 illustrates the ability of the administration adapter 10 to provide a range of options to the remote user. As shown in FIG. 3 a remote user has chosen to reboot the PC-Server. FIG. 4 illustrates the display of the display information as the BIOS performs its system and peripherals checks. The illustrated display is a simple one, typically based on a text mode compatible between the PC-Server and the administration adapter 10.

To minimize the administration adapter's onboard microprocessor requirements, the simplest and lowest memory-intensive display adapter emulation was selected for the preferred embodiment. To all intents and purpose, the administration adapter 10 is recognized by the BIOS 4 as an MDA display adapter. The administration adapter achieves this by emulating the MDA's registers and behavior including the 6845 CRT video controller and the "video" memory or frame buffer. Thus the administration adapter 10 emulates a display adapter on the PC-Server and is targeted for receiving system board console output which is available on the bus 5 such as data issued from the BIOS 4 and which is normally directed through the bus 5 to a display adapter and to a local video display, if displayed at all. Examples of such displayed data include display adapter diagnostics, amount of installed RAM 3, boot or fixed disk parameters, CD-ROM driver installation, and information regarding BIOS settings (See FIG. 4).

Video output of primary interest and which is written to the administration adapter 10 is display data, textual in the case of an MDA adapter which, which is formatted according to the text mode set by the system board 1 and compatible with text modes available on the administration adapter 10. In its most elementary form, the administration adapter 10 emulates an MDA (monochrome display) adapter having only one format; text normally displayed at 80 characters by 25 lines (80×25). For a VGA (video graphics) and later adapters, besides having greater graphical capability, provide the capability for other text modes, one of which is 132 characters by 60 lines (132×60).

Optionally, data communicated between the administration adapter 10 and the remote console 9 can include graphical data, coordinate and state data. Graphical data can be communicated and displayed to the remote user as graphical data at the console 9, or graphical character data can be recognized, and communicated as text.

For a BIOS 4 used in conjunction with an ISA bus 5, functional emulation of the MDA adapter is achieved by emulating video RAM 13 of frame buffer and video controller I/O registers.

Specifically, the administration adapter 10 comprises a bus connector 12 and dual port RAM 13 for storing the frame buffer and I/O registers. Conventional serial communications hardware comprises a bus-recognized 16550 UART 14, a DUART 15 connected to a DB-9 RS-232 serial output connector. A first microprocessor 16 controls monitoring of the dual port RAM for bus writes, reads any written data and analyses it. In one embodiment, the first microprocessor 16 extracts textual display data from the dual port RAM 13 and converts it to a form suitable for transmission in some form via the UART/DUART 14,15 and to the remote console 9. A PC-reset relay 17 is controlled by microprocessor 16 and is hardwired to the system board reset 8. A serial debug port 18 is provided for adapter diagnostics.

A second microprocessor 20 is provided for specifically converting data received from the remote console 9 into emulated commands which are recognized by the PC-Server's input interface as commands. Graphical data or graphical user interface data (such as through a pointing device or mouse) received by the administration adapter can be recognized for extracting instructions directed to the administration adapter. Such extraction can comprise implementing command instructions such as character recognition for extracting textual data or a lookup table data corresponding to mouse coordinate and mouse-click state data.

In one simple embodiment, the second microprocessor 20 specifically converts received data to emulated keyboard commands such as scan codes recognized by the system board keyboard input device 7. In the simplest case, the scan codes are conducted to the system board via cable 21 to keyboard port as an input interface 6. In another embodiment, received data is converted for emulating commands which are recognized by other input interfaces such as the PS-2 interface, USB (universal serial bus), the PCI bus itself or a mouse interface.

The corresponding RAM 13 memory locations for this MDA emulating adapter occupy 4K bytes of dual-port video RAM occupying addresses 0xb0000-0xb0fff. The administration adapter 10 does not need to use all of the MDA I/O registers such those used for video display synchronization, video status or parallel printer interfacing. More particularly, administration adapter 10 emulates two bytes of registers at port addresses 0x3b4 and 0x3b5, specifically being for the adapter's 6845 CRT controller. The 6845 CRT controller occupies two bytes in the bus I/O space, but contains 18 data registers, each accessible by first writing the register's address into the "CRTC address register", then reading/writing the data to/from the selected register via the "CRTC data register". The 6845's registers include video timing control (write-only), cursor address MSB (read/write), cursor address LSB (read/write), and light pen location (read-only). Of these, only the cursor address registers are relevant for providing sensory feedback capability to the remote user. The administration adapter 10 makes the registers at 13 available to the first 68HC11 microprocessor 16.

The bus 5 writes textual display data to the frame buffer, identified as being at the dual port memory or RAM 13 located on the administration adapter 10. Dual port RAM 13 permits the system board 1 to write the data while the adapter 10 simultaneously polls the data to see if any character in a line of 80 characters has changed since the last poll. The administration adapter 10 performs MDA emulation by trapping frame-buffer writes to the MDA's address space, calculating console screen coordinates, within the 80×25, based on the address and converting that data capable of serial transmission. One data form is standard ANSI (e.g. VT-100) escape sequences. Character attributes such as blink, highlight, and underline are also converted to escape sequences. Thus the 80 character line, with attributes, actually requires 160 bytes of information. Ultimately, these escape sequences, in addition to the actual character data, are sent to the remote user console 9.

Figure 6:
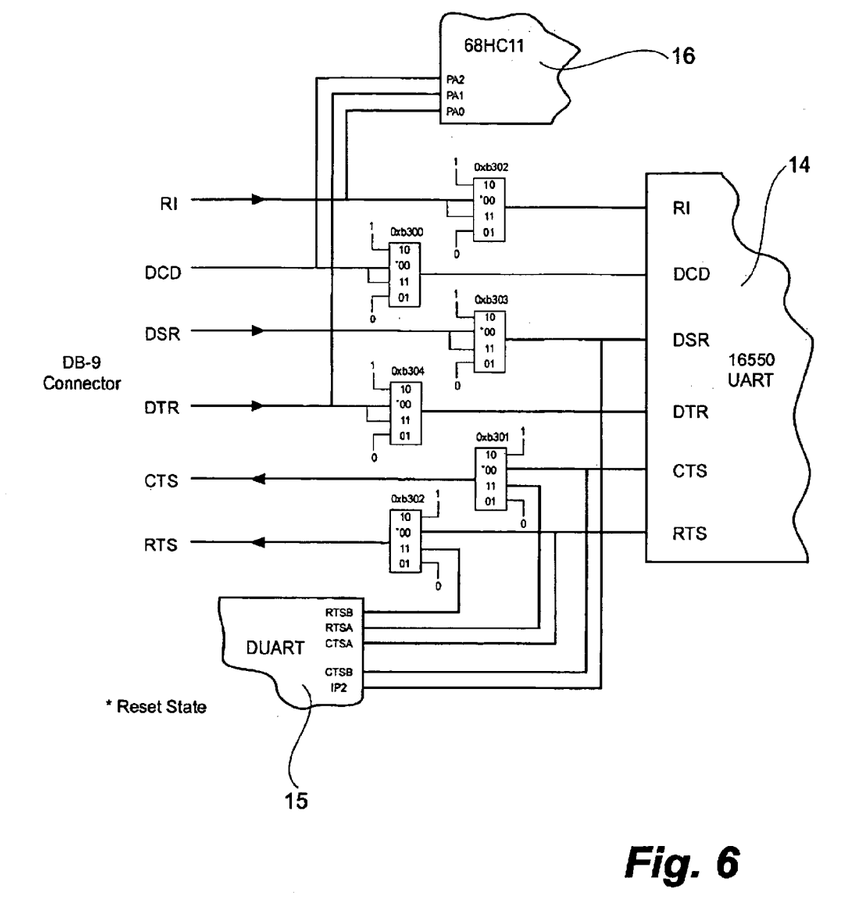
FIG. 6 is a schematic diagram illustrating the relationship between the 68HC11 microprocessor, the UART, the modem registers and the DUART.

The first microprocessor 16, such as the Motorola M68HC11 HCMOS single-chip computer ("68HC11") controls the adapters reading from, and possible writing operations to, the frame buffer. By providing a video update register 19, overhead on the 68HC11 microprocessor 16 is reduced by detecting writes by the bus 5 to the MDA frame buffer 13 without reading the whole frame buffer. Each bit corresponds to one line of characters on a video display. Any bus write to the frame buffer sets the bit in the video register corresponding to that line. Reading a byte clears that byte.

Further, for additional debugging capability, the administration adapter 10 emulates an additional I/O port 0x80 on the bus 5. When a PC-Server exits reset and executes the contents of its BIOS 4, the startup sequence generally includes a number of hardware diagnostic tests. At the beginning and end of each test a byte (the "Power On Self Test", or "POST" byte) is output to port 0x80 indicating the progress of the tests. Should a test in the sequence fail, the sequence is halted and the last byte written to the POST port remains as an indicator of the cause. The administration adapter 10 monitors bus writes to this port 0x80 and retains the most recently written byte (last POST byte) for the remote user. The last POST byte written in a successful startup will normally be 0x00.

For implementing VGA and higher adapter emulation including graphics recognition, different RAM capability and greater microprocessing capability would likely be required.

The conventional output escape sequences are sent via serial communications to the remote user. The preferred interface is a PC compatible serial RS-232 controller, such as a ST16C550 UART from Exar Corporation. Note that other and higher speed serial devices, such as USB, Ethernet or other broadband network interfaces are known and are similarly adaptable for this use.

The UART 14 is a serial communications device to and from the RS-232 port 15b. The serial device is address and interrupt configurable to the industry standard COM ports. As stated in a character and keyboard emulation embodiment, the serial device 14,15,15b outputs console data to the remote user and receives emulated keyboard data therefrom. In the simplest case, the serial communications passes all received data to the PC-Server.

Alternatively, the administration adapter's onboard 68HC11 microprocessor 16 monitors each character received by the serial communications 15b,15,14 to determine if the keyboard input communication should be passed through to the PC-Server, or if an attention command sequence is received for conducting administration adapter specific operations. Accordingly, a Philips Semiconductor SC26C92 Dual Universal asynchronous receiver/transmitter (a DUART) 15 is employed, substantially being dual UARTS. Further, modem registers 25 are stored so that the administration adapter 10 can monitor the six standard modem control signals (RI, DCD, DRS, DTR, CTS AND RTS) and pass through or override the default modem register settings provided by the remote devices.

Keyboard command inputs to the PC-Server are received as command data from the serial port 15b, and if it is to be passed through, mapping it to, or emulating, PC keyboard scan-codes. The second microprocessor 20 controls the keyboard output to the PC-Server's input interface 6. A suitable microprocessor 20 is the Atmel Corporation, AT90S4433, known as an AVR. The scan codes are output to the keyboard interface 6. The connection between the administration adapter 10 and keyboard interface 6 is usually through an electrical cable connector 21 to the system board keyboard input interface 6 (or DIN jack in this instance), but it also known to include infrared (IR), various bus or hardware interfaces such as mouse or USB port interfaces.

The keyboard interface 6 permits remote user intervention or input to the PC-Server through this keyboard emulation. If desired, the administration adapter 10 functions to merely to pass remote user keyboard scan codes to the PC-Server. The serial interface simply passes character output to the remote user and accepts and passes on emulated keyboard commands to the keyboard input interface of the PC-Server.

However, preferably, the administration adapter 10 has advanced function capability, such as having the ability to variably reset or suspend the PC-Server, alter the emulation or get the keyboard status, if is necessary to distinguish commands which should interpreted as being destined for the PC-Server or locally for the administration adapter.

To get the attention of the administration adapter, the serial device listens for a predefined or user-defined character. Typically, such a character is one which is not regularly used by the PC-Server or application program. Even if the attention character has both a local attention function and a PC-Server function, repeating of the attention character will pass it through to the PC-Server.

One function of the administration adapter 10 which is accessible through and attention character is the ability to reset the PC (FIGS. 3,4). While it is possible also to pass through a soft reboot command using the ubiquitous <ctrl><alt><del>, occasionally the PC-Server is so messed up that a hardware reboot is required. The administration adapter 10 is provided with a PC-reset 17 which provides a mechanical relay contact closure hard-wired 22 to a PC-reset on the system board 1. Optionally, with the newer ATX-type system boards, the administration adapter can perform a power cycle reset.

The administration adapter 10 is further enhanced if it can be configured to provide added functionality to the remote user. Normally, the administration adapter 10 works transparently, passing data back and forth between the remote user and the PC-Server. For simplicity, this description is set forth in the context of character data between the PC-Server and the remote console 9. In order to communicate local controls to the administration adapter 10, the remote user must send a specified attention character. Due to the low probability of having a duplicate function at the PC-Server, the default for the attention character is ASCII 0x1e (<control><^> or <control><~>), but may be altered by the user. Upon receipt of the attention character, the administration adapter responds by prompting the user for a command, as shown in FIG. 2.

In order to provide this local adapter configuration capability, the administration adapter 10 further comprises two code stores: a non-volatile EPROM bootloader 30 and a FLASH memory 31 partitioned into four blocks for storing the board's operating code. Additional RAM 31 is provided for the first microprocessor 16 and EPROM 30. Having reference to FIG. 5, when the administration adapter is powered up with the PC-Server, (or reset) the bootloader reads the header of each FLASH partition, determines if any contain boot images, and if any are marked as the "default boot" image. This information is presented to the user via the serial console port. The bootloader then proceeds to count down approximately five seconds, during which the remote user may accept the default boot, interrupt to select a different boot image or wait out a five second countdown timer using input commands <return>, <esc>, or by typing nothing at all. Typing <return> truncates countdown timer and causes the administration adapter to immediately boot the default image. Typing <esc> invokes the bootloader's FLASH programming routines, preparing the administration adapter to accept a new operating image from the remote user. Should <esc> be typed inadvertently, the user simply types <return> to boot the default image (as though <esc> had never been pressed) or specify booting a non-default image. Typing nothing at all causes the administration adapter to boot the default image at the conclusion of the five second countdown.

Different boot images can contain different configurations including settings for serial port configurations and alternate keyboard emulation mapping.

Once a boot image has been selected, use of the attention character signals the administration adapter to exit emulation mode and await commands from the user. For instance, the user may issue a command or press <?> or <h> and be rewarded with a help screen as shown in FIG. 2. Issuing an <r> ("reset") causes the reset to be asserted for a period of 500 ms, then released. Issuing an <i> ("in") causes the reset to be asserted and held in the asserted state until the user issues an <o> ("out") command, releasing the reset and allowing the PC-Server to boot. This allows a remote user to take the machine offline by brute-force means and keep it there indefinitely. A keyboard status in inquiry can be made by issuing an ^x which then queries the keyboard emulation as to its state. This is primarily useful for debugging system problems, and is not of much interest if the system is behaving itself. A ^l command causes the administration adapter 10 to redraw the display, useful in the event that the display becomes out of sync with the MDA emulation due to an event such as line noise.

Sometimes, the keyboard commands accepted by the PC-Server are not available on the remote user's keyboard, e.g. <alt>. Accordingly, the administration adapter 10 can send a specific key or combination of keys to the PC using a mnemonic scheme.

A PC keyboard utilizes keys that, while being normally thought of as modifiers for other keys (such as <shift>, <control>, and <alt>) in fact generate their own output codes even when not used in conjunction with any other keys. Thus, in order to comprehensively emulate the PC keyboard's behavior, the administration adapter 10 provides for the use of these keys in both contexts—either as modifiers or alone. Thus, upon entering the Attention Character and the command <x>, the user is prompted for the keys to be output.

Figure 7:
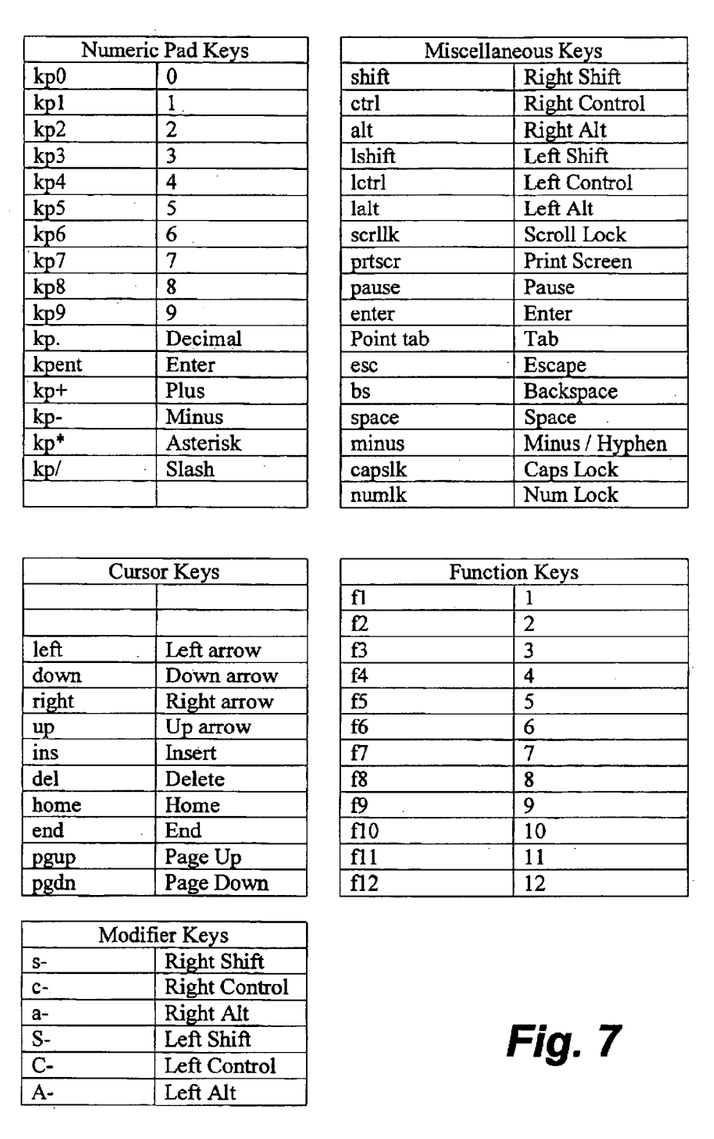
FIG. 7 is a table of mnemonics for enabling the emulation of a PC-Server keyboard with individual keystrokes.

FIG. 7 lists the supported keys and their associated mnemonics. Additionally, FIG. 7 lists the mnemonics for the <shift>, <control>, and <alt> keys as appropriate for their use as modifiers.

Typing the mnemonic outputs the appropriate key code to the keyboard interface. Only one key may be output per operation. Entering the mnemonics for more than one key returns an error message. For instance, to send <NUM LOCK>, the user types: <Attention Character> <x> <n> <u> <m> <l> <k> <return>.

Any number of modifier keys (from one to six) may be used at a time to modify the key being. To send <Left Shift><Function 12>, type <Attention Character> <x> <S> <-> <f> <1> <2> <return> and to reboot the PC, type: <Attention Character> <x> <c> <-> <a> <-> <d> <e> <l> <return>

Other commands are available relating to functions one can ask the adapter to execute. The administration adapter 10 maintains the user-customizable configuration information in the non-volatile EEPROM 30.

Figure 8:
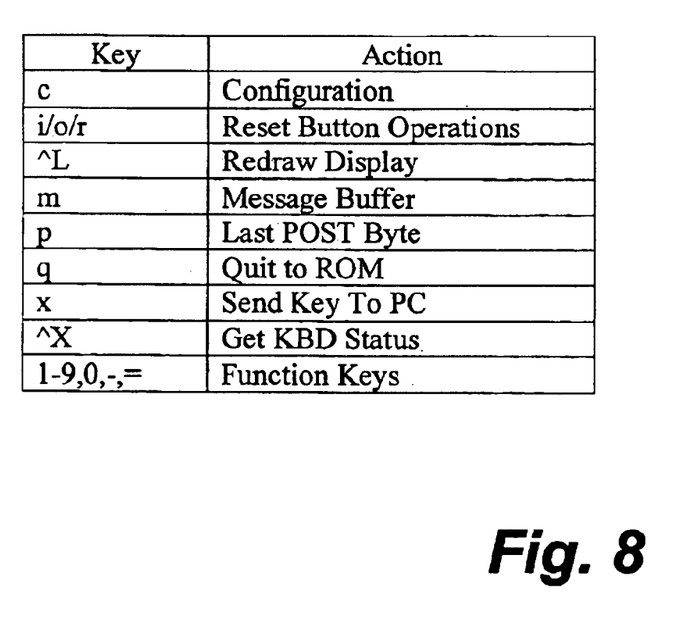
FIG. 8 is a table of command choices available for configuration of the administration adapter.

Having reference also to the table in FIG. 8, a <c> command invokes the configuration menu, allowing the user to change selected parameters. The configuration menu is exited by pressing the <esc> key, at which time any changes made are committed.

An <m> command accesses the message buffer. Some administration adapter device drivers supply warning or error messages. These messages are logged in a 1 Kbyte ring buffer. The contents of the message buffer—the most recent 1024 bytes logged—can be viewed using this m command. These messages are also transmitted out the optional debug RS-232 port.

The <p> command access the last POST byte. When a PC exits reset and executes the contents of its BIOS, the startup sequence generally includes a number of hardware diagnostic tests. At the beginning and end of each test a byte is output to port 0x80 indicating the progress of the tests. Should a test in the sequence fail, the sequence is halted and the last byte written to the POST port remains as an indicator of the cause. The administration adapter monitors bus writes to this port and retains the most recently written byte for the user. The last byte written in a successful startup will normally be 0x00. If this is the case, the <p> command will return the word "Nothing". POST codes are specific to the BIOS manufacturer.

A <q> command quits the administration adapter. This command allows the user to force the administration adapter to begin execution of the bootloader EPROM code as though it were just reset. This is primarily useful to those developing code for the board, as it provides a method of exiting the normal operating code and entering either the bootloader or the RS-232 debug monitor, depending on the setting of the memory map. If configured to "Reset PC on boot", executing this command will cause the administration adapter to reset the PC-Server.

As discussed above and in FIG. 5, the administration adapter 10 first executes bootloader routines when the administration adapter 10 is reset, either manually or upon power-up. After initialization, the bootloader counts down a five-second delay, at the conclusion of which (assuming the user does not intervene) the bootloader will identify and commence execution of the default software image. A "Reset PC on Boot" configuration option allows the user to control the startup sequence of the administration adapter and the PC-Server. If this option is set to YES, the bootloader places—and holds—the PC-Server in reset as soon as the administration adapter comes out of reset. Once the administration adapter is up, it releases the PC's reset and allows the PC-Server to boot. This ensures the user is able to monitor the entire boot sequence. It also allows the user an arbitrary amount of time to perform configuration operations on the administration adapter while delaying the PC-Server's boot.

Figure 5:
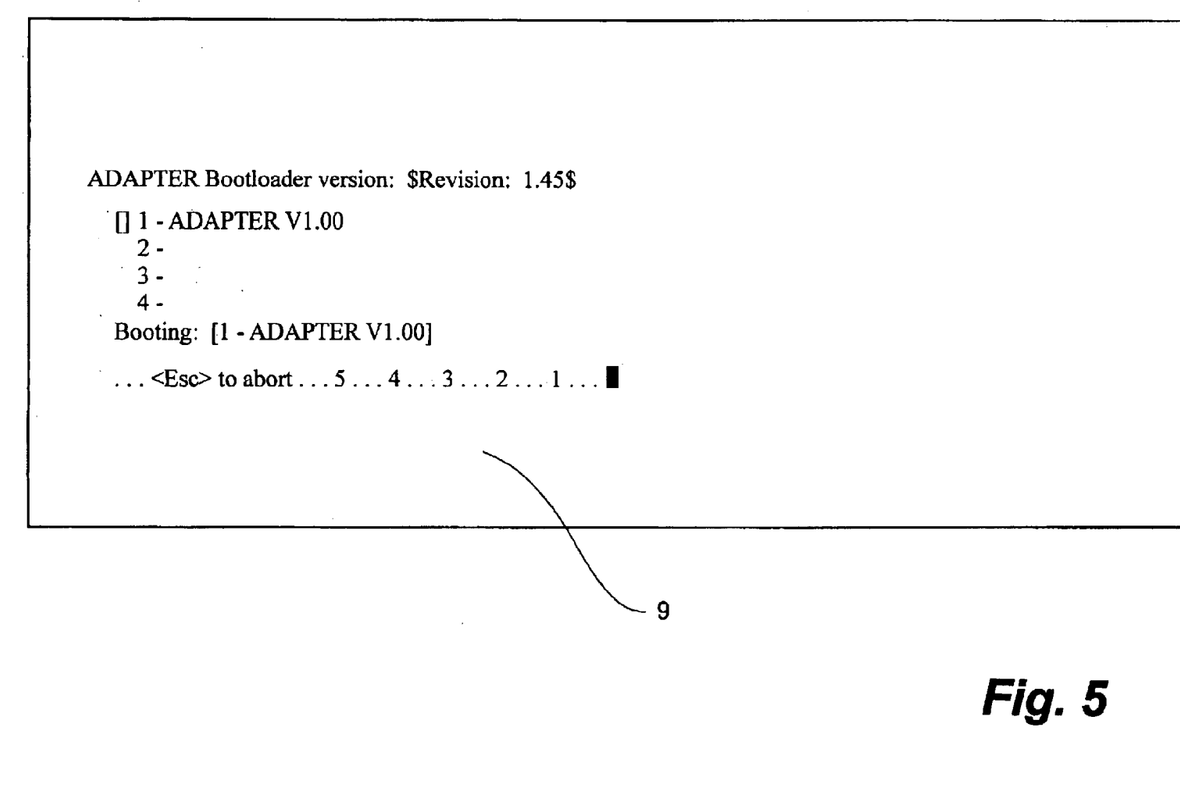
FIG. 5 is a screen display at a console of the remote user illustrating a configuration option screen upon reset of the administration adapter.

Selecting YES also causes the bootloader to force the PC-Server PC into reset if the user uses a "q—Quit to ROM" command to exit the administration adapter's operating software and enter the bootloader. Conversely, selecting NO allows the PC-Server to boot regardless of the operational state of the administration adapter, and allow the user to exit to the bootloader without forcing the PC-Server into reset, desirable in the event that the user wishes to load a new operating image into the administration adapter's FLASH without bringing down a running PC-Server.

The administration adapter's two basic modes of operation are:

- an emulation mode, in which characters written into the video frame buffer by the PC-Server bus are converted to serial data and transmitted to the remote user, and input received from the user is presented to the PC-Server as though originating from a local input interface such as a keyboard; and
- Serial Pass-through mode, in which the PC-Server communicates bidirectionally via the administration adapter's onboard 16550, with data passed back and forth between the PC-Server and the remote user by the administration adapter's microprocessor.

To the PC-Server, the administration adapter represents two distinctly separate I/O devices: serial communications and a video board. This means that although the board has two channels capable of simultaneously generating outbound data destined for the user, there is only one channel via which that output can be directed to the remote user—the RS-232 port.

By default (that is, with Serial Pass-through mode disabled by setting it to "NO" in the Configuration menu) the administration adapter operates in Emulation mode only. The MDA and keyboard emulations are in full-time operation, and although the 16550 UART, if enabled, is available to the PC-Server's bus, its serial I/O is disconnected from the outside world. If Serial Pass-through mode is enabled (ie set to "YES" in the Configuration menu) the administration adapter monitors the 16550 UART for activity, and upon detecting a character output from the 16550 UART exits emulation mode and begins to relay characters between the 16550 UART and the RS-232 connector.

Conversely, if the administration adapter 10 is operating in Serial Pass-through mode and detects data written to the MDA buffer, it disconnects the 16550 UART's serial I/O and switches back to emulation mode.

In either mode the administration adapter continues to monitor the data stream input by the user and brings itself online upon detection of the attention character.

This is an arrangement that allows for the greatest possible flexibility and user choice in determining how the PC-Server's console appears to its operating system, while ensuring that a functional console is always available on a machine that has crashed down to the BIOS.

Some optimizations are performed on video-emulation data by the local processor. For example, the generation of unnecessary cursor addressing information is suppressed for writes to adjacent/consecutive video RAM locations. Although the video-to-serial emulation is complete and usable at all levels of machine operation, it is primarily designed for sub-OS use; that is, for motherboard and peripheral BIOS configuration and bootstrap monitoring.

The emulation, though proper, carries high local overhead and is accordingly slow. It is thus intended that once the user's OS is running, it can invoke a standard COM-port serial console application. This transition is made seamlessly on the emulator board by toggling the RS-232 connector's data path from the video-emulator's output to the UART's output upon detection of writes to the UART's transmit register (and back again if MDA video space is written to).

a) System power-on; administration adapter comes out of reset in emulation mode.

b) A write is made to MDA space by the BIOS. Data written to video memory is converted to serial output.

c) BIOS goes through normal boot sequence, continuing to send data to the MDA admin adapter. At this point the user may interrupt the normal boot sequence for purposes of configuration.

d) BIOS loads operating system bootblocks. These are compiled for serial output. Bootblocks write data to the serial port address; the adapter disconnects the RS-232 connector from video emulator's serial output and connects it to the onboard 16550 UART. All input/output is exactly as it would be with a standard PC serial port.

e) Operating system loads and runs in serial console mode.

f) Operating system is rebooted. System resets, goto (b).

It is conceivable that the PC-Server may hang without an administrator user being aware or available to take corrective action. For these situations it is useful to employ a watchdog timer so that the administration adapter can to detect such failures and automatically reboot the PC-Server. Accordingly, a suitable software hook is implemented on the PC-Server and is monitored by the interface. For instance, the operating system kernel can be modified or a background application process provided for periodically generating a watchdog character sequence written to the MDA frame buffer. If the significant sequence is not received within a predetermined time, then the administration adapter can deem the PC-Server to be unstable or locked-up and accordingly cause the PC-Server to reboot.

Note that in Windows NT (Microsoft Corporation) operating systems, a video adapter must be present else the system will not operate. Hence, it is likely a monitor is also provided and, if so, then a local keyboard is likely also available. The administration adapter then must co-exist with the NT video adapter and be restricted to receiving write-only commands from the bus functions (the administration adapter eavesdrops only) to avoid conflict with the NT video adapter. Further, the hardwired input interfaces, such as keyboard connectors must permit flow-through of the local interface scan codes until such time as a write to the frame buffer is character detected at which time emulated input from the administration adapter is given priority.

In a further application, the administration adapter can be used to implement a text to speech system for assisting blind The embodiments of the invention for which and exclusive property or privilege is claims are defined as follows:

1. Apparatus for administration of a PC-Server, the PC-Sewer having an architecture which outputs console data to a data bus for read and write functions to peripherals including a display adapter, and having an input interface, comprising:

an adapter on the bus for
emulating a display adapter to an extent necessary to receive display data from the PC-Server's bus, and for outputting display data through conventional video signal;
one or more microprocessors for
extracting the display data from the adapter;
converting display data to a textual data stream compatible for transmission to a remote user;
one or more serial devices for transmitting the textual data stream to a remote user; and
wherein the one or more microprocessors further
receive the data stream from the remote user representing input commands to the PC-Server; and
transmit input commands to, and compatible with, the PC-Server input interface.

2. The administration apparatus as recited in claim 1 wherein the means for transmitting the input commands to the PC-Server input interface comprise means for emulating commands compatible with a keyboard input interface.

3. The administration apparatus as recited in claim 2 wherein the keyboard input interface is a serial device.

4. The administration apparatus as recited in claim 3 wherein the keyboard input interface is a keyboard jack.

5. The administration apparatus as recited in claim 2 wherein the input interface is a wireless device.

6. The administration apparatus as recited in claim 1 wherein the display data is graphical, further comprising means for converting the graphical display data to textual display data for transmission of the textual data stream to a remote user.

7. The administration apparatus as recited in claim 1 further comprising:

a hardware reset switch of the PC-Server; and
wherein the one or more microprocessors of the administration apparatus determine if an input command is a reset command and actuates a relay for actuating the hardware reset of the PC-Server.

8. The administration apparatus as recited in claim 7 further comprising:

software hook in the PC-Server operating system for periodically writing a predetermined string on the bus to a specified watchdog address on the adapter; and wherein
the one or more microprocessors time the duration between sequential writing to the watchdog address and comparing the duration to a predetermined time; and
the hardware reset of the PC-Server is actuated if the duration between sequential writes exceeds the predetermined time.

9. A method of remote user administration of a PC-Server having a data bus for read and write functions to peripherals including a display adapter, and having an input interface, comprising the steps of:

providing a peripheral adapter on the bus which emulates the display adapter to an extent necessary to receive display data from the bus and which has a serial communications device for transmission of data between the PC-Server and the remote user;
determining if the bus has written display data to the adapter;
extracting the display data from the adapter;
converting display data to textual display data before transmission to the remote user,
transmitting the textual display date via the communications device to the remote user;
receiving input commands from the remote user via the communications device; and
transmitting the received input commands to and compatible with the input interface.

10. The method as recited in claim 9 wherein the display data is graphical further comprising converting the graphical display data to textual display data before transmission to the remote user.

11. The method as recited in claim 9 further comprising transmitting display data and receiving input commands via a serial communications device.

12. The method as recited in claim 9 further comprising emulating input commands compatible with the input interface using a microprocessor.

13. The method as recited in claim 9 wherein upon receiving the input commands further comprising:

determining if the received input commands comprise a reset command; and
actuating a relay for actuating a hardware reset of the PC-Server.

14. The method as recited in claim 9 wherein upon receiving the input commands further comprising:

setting a software hook in the PC-Server operating system for periodically writing a predetermined string on the bus to a specified watchdog address on the adapter;
timing the duration between sequential writing to the watchdog address and comparing the duration to a predetermined time; and
actuating a relay for actuating a hardware reset of the PC-Server if the duration between sequential writes exceeds the predetermined time.

15. A method for implementing a speech synthesis system from a PC-Server having a data bus for read and write functions to peripherals including a display adapter, comprising the steps of:

providing a speech synthesis device which accepts textual data;
providing a peripheral adapter on the bus which emulates a the display adapter to an extent necessary to receive display data from the bus and which has a serial communications device for transmission of data between the PC-Server and the remote user;
determining if the bus has written display data to the adapter;
extracting the display data from the adapter;

converting display data to textual display data before transmission to the remote user, transmitting the textual display data via the communications device to the speech synthesis device.

16. The method as recited in claim 15 wherein the PC-Server has a keyboard input interface, further comprising the steps of receiving keyboard commands from a user; and transmitting the received keyboard commands to and compatible with the keyboard input interface.

17. The method as recited in claim 15 wherein the display data is graphical further comprising converting the graphical display data to textual display data before transmission to the remote user.

\* \* \* \* \*